UNITED STATES PATENT OFFICE.

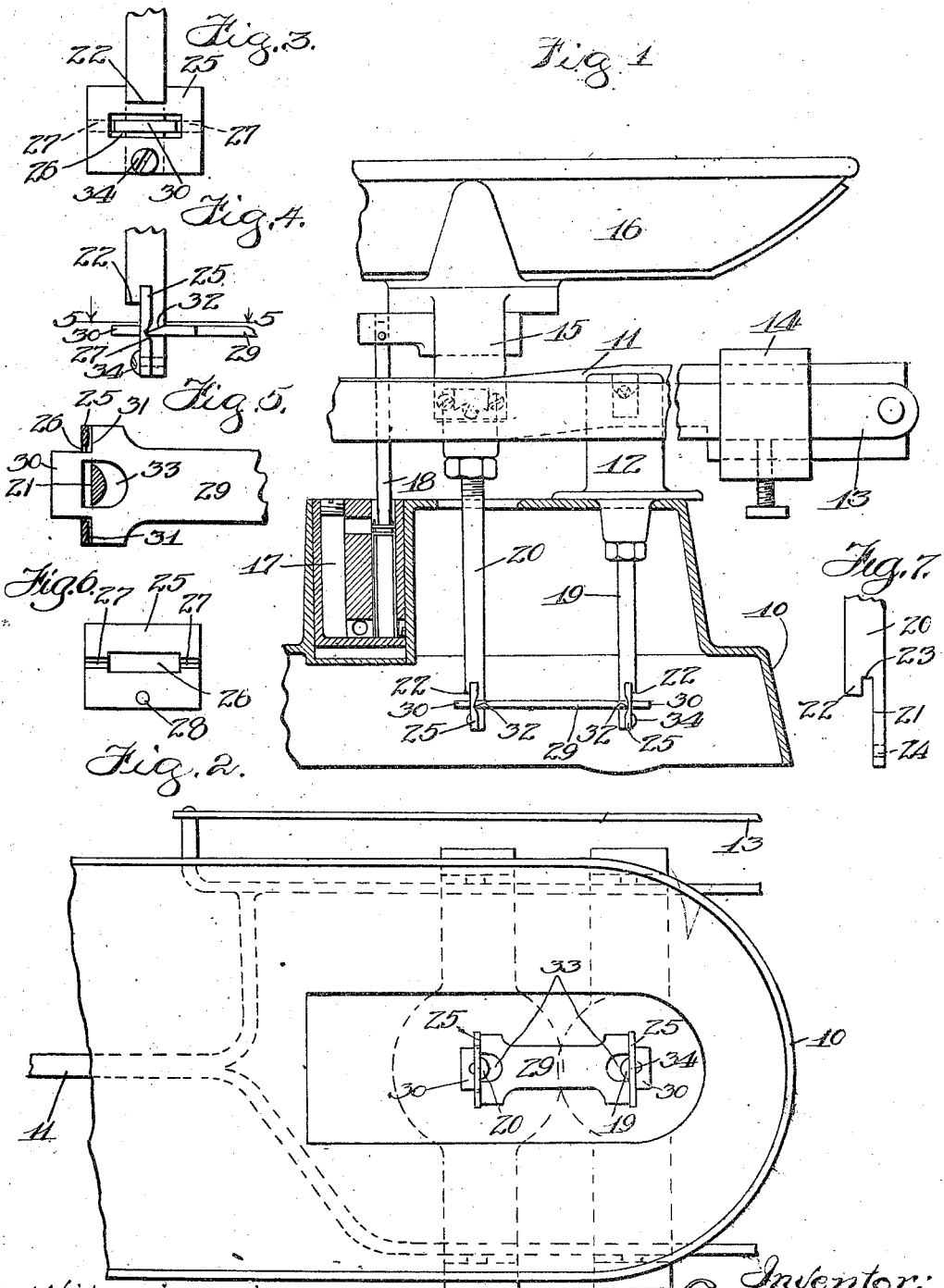

LAWRENCE C. OSTENDORF, OF DUNDEE, ILLINOIS, ASSIGNOR TO JOSEPH E. COCHRAN, OF DUNDEE, ILLINOIS.

WEIGHING-SCALE.

No. 901,994.    Specification of Letters Patent.    Patented Oct. 27, 1908.

Application filed February 19, 1906. Serial No. 301,756.

*To all whom it may concern:*

Be it known that I, LAWRENCE C. OSTENDORF, a citizen of the United States, residing at Dundee, in the county of Kane and State of Illinois, have invented certain new and useful Improvements in Weighing-Scales, of which the following is a full, clear, and exact specification.

This invention relates to weighing scales, and more particularly to that class of scales adapted for counter use, for weighing small quantities of merchandise, and it has for its primary object to provide an improved means for maintaining the pan or platform supporting standard in a vertical position.

A further object is to provide an improved construction of link, one end of which is pivoted to a stationary support or fulcrum, and the other end to the pan or platform support or standard.

A further object is to provide an improved form of bearing for the point of pivotal connection between the link and the respective members.

A further object is to provide an improved form of link for maintaining the pan support or standard in a vertical position, which will be simple in construction, effective in operation, and in which all friction is reduced to a minimum.

To the attainment of these ends, and the accomplishment of other new and useful objects, as will appear, the invention consists in the features of novelty in the construction, combination and arrangements of the various parts hereinafter more fully set forth and claimed, and shown in the accompanying drawing, illustrating an exemplification of this invention, and in which—

Figure 1 is an elevation, partly in section, of a portion of a scale constructed in accordance with the principles of this invention. Fig. 2 is a bottom view of Fig. 1, and a bottom plan view of the connecting link. Fig. 3 is a front elevation of the link bearing. Fig. 4 is a side elevation of Fig. 3. Fig. 5 is a sectional view on line 5—5 of Fig. 4, looking in the direction of the arrows. Fig. 6 is an elevation of the bearing plate. Fig. 7 is an end elevation of the extremity of one of the rods which supports the bearing plate, and with the plate detached.

Referring more particularly to the drawings, the numeral 10 designates a support or base, 11 a scale beam, 12 a fulcrum for said beam, 13 a tare-beam, 14 a tare-weight, 15 a pan or platform support pivotally mounted on the scale beam, 16 a scale pan, 17 a dashpot, and 18 a piston moving in the dash-pot and having a pivotal connection with the scale pan or platform. All of these parts may be of the ordinary or of any desired construction, and constitute no part of the present invention.

Within the base or support, and preferably depending from the top thereof and adjacent the fulcrum or support 12, is a bar or rod 19, preferably removable, and held in position in any suitable manner. Depending from the pan or platform support 15, and secured thereto in any suitable manner, is a similar rod or bar 20, which is parallel to the rod or bar 19. The extremities of each of these two rods or bars 19, 20, stand in a direct line, when the scale pan is in its normal position, with nothing resting thereon. The ends of these rods are reduced or cut away as at 21 (more clearly shown in Fig. 7). The shoulder 22 formed by the reduced portion is recessed or grooved as at 23, and the reduced portion is provided with an aperture 24, which is preferably screw-threaded.

A plate 25 having an enlarged central aperture 26 is provided with alined V-shaped grooves or notches 27, which are located preferably on both sides of said aperture, and remote from the top and bottom edges thereof, said plate being also provided with an aperture or opening 28, and the vertical diameter of this plate is exactly equal to the distance from the extremity of the reduced or cut-away portion 21 of the rods or bars 19, 20, to the base of the recess or groove 23. The thickness of the plate being slightly smaller than the width of the groove or recess.

The numeral 29 designates a link of any suitable shape and of a length slightly greater than the distance between the rods or bars 19, 20. The extremities of this link are reduced to form a centrally projecting portion 30, having shoulders 31 located on either side thereof, and one face of said shoulders are beveled or inclined, as at 32, toward the extremities of the link, to form a narrow or knife edge. Each of the extremities of the link is also provided with an aperture 33 adjacent and between the knife edges 31, and said aperture is of a size somewhat larger than the diameter of the reduced portions of the rods or bars 19, 20. This link is adapted to connect the extremities of the rods or bars 19, 20, and is secured thereto in the following manner.

The extremity of either one or both of the rods or bars 19, 20, are first passed through their respective apertures 33 in the end of the link 29 for a very short distance. The plate 25 is then placed in position so that the knife edges 31 of the link will rest in their respective groove or notch 27, and with the reduced portion 30 projecting through the aperture 26 therein. One edge of the plate is then inserted under the shoulder 22 and into the groove or recess 23 in the rod or bar 19 or 20, a sufficient distance to cause the aperture 28 in said plate to register with the aperture 24 in the reduced portion of the rod, and a bolt or screw 34 is passed through the registering apertures for securing the plate in position. The plate 25 is considerably wider than its respective bar or rod 19, 20, and the aperture 26 also extends beyond the sides of the bar or rod, so that the knife edges 31 will engage and rest in the notches or grooves 27 at points remote from the edges of said rods.

It will thus be seen that with such a construction, the scale pan or platform will always be maintained in a horizontal position, and that the knife edge bearings formed at the pivotal point of connection of the link with the rods or bars reduces the friction to the minimum, and will in no way interfere with the sensitiveness of the scale.

It is to be understood that it is not desired to be limited to the exact details of construction or arrangement of the several parts, as numerous changes may be made without departing from the spirit of the invention.

What is claimed as new and desired to be secured by Letters Patent is:

In combination, in a scale, a link bearing, comprising a link provided with a centrally disposed projecting portion extending from the extremities thereof and having apertures adjacent the projections, the extremities of the link on each side of the projections being beveled to form knife edges, a rod passing through the aperture and provided with a reduced extremity to form a shoulder, said shoulder having a transverse groove therein, a plate of a length greater than the width of the rod, and provided with an aperture also of a length greater than the width of the rod, and means for securing the plate to the rod with one edge thereof resting in the groove, and with the projecting portion of the link passing through the aperture therein, the sides of the plate resting against and forming a bearing for the knife edges of the link.

In testimony whereof I have signed my name to this specification, in the presence of two subscribing witnesses, on this 16th day of February, A. D. 1906.

LAWRENCE C. OSTENDORF.

Witnesses:
CHAS. C. WOLAVER,
F. H. REESE.